United States Patent [19]

Stefan

[11] Patent Number: 4,955,090
[45] Date of Patent: Sep. 11, 1990

[54] ZERO GRAVITY TOILET

[76] Inventor: Alexander Stefan, 216 E. Arby Ave., Las Vegas, Nev. 89119

[21] Appl. No.: 436,314

[22] Filed: Nov. 13, 1989

[51] Int. Cl.$^5$ ............................................. B64D 11/02
[52] U.S. Cl. ............................................. 4/316; 4/434
[58] Field of Search ...................... 4/316, 434, 435

[56] References Cited

U.S. PATENT DOCUMENTS

| | | | |
|---|---|---|---|
| 3,034,131 | 5/1962 | Lent .................................. | 4/316 X |
| 3,329,974 | 7/1967 | Belasco et al. .................... | 4/316 |
| 3,340,543 | 9/1967 | Cella .................................. | 4/316 |
| 3,340,544 | 9/1967 | Cella .................................. | 4/316 |
| 3,405,409 | 10/1968 | Bennett ............................. | 4/316 X |
| 4,870,709 | 10/1989 | Thornton et al. ................. | 4/316 |

*Primary Examiner*—Charles E. Phillips
*Attorney, Agent, or Firm*—Charles C. Corbin

[57] ABSTRACT

A toilet, particularly adapted for handling liquid and solid bodily waste in a zero gravity environment, including a housing with a main wall having a central waste-receiving opening therein, and a plurality of toroidal elements in close stacked relationship in a coaxial array that extends inwardly of the housing from the central opening, and a flexible, resilient inner wall of each element being inwardly expandable and retractable, and air compression and suction means in flow communication with each element for pneumatically expanding and contracting the flexible wall of each element. A flexible bag has an open end that mounts about the central opening, an elongated neck portion that is embraced by the toroidal elements, and another portion for accumulating waste material. The bag is porous to gases and impervious to solids and liquids. Spray means can inject a water spray at the central opening, and housing exhaust means can cause airflow into the open end of the bag and out through its porous walls. Control means for the air pressure and vacuum sources cause the elements of the toroidal array to contract sequentially across the neck of the bag in an inwardly moving peristaltic-like wave.

10 Claims, 2 Drawing Sheets

ZERO GRAVITY TOILET

BACKGROUND

1. Field of the Invention

This invention relates to toilets adapted for use under zero gravity conditions, and more particularly a toilet of the above type for handling liquid and solid waste material.

2. Description of the Prior Art

The problem of collecting and handling human waste material in zero gravity is a unique one, and one which must be properly addressed since without a reliable and effective waste handling system the success of a space mission will be in jeopardy. Escaping waste in zero gravity will float within a spacecraft, and can spread throughout the living environment. This would result in contamination of physical structure and could damage equipment, as well as subjecting the occupants to a health hazard. In addition, the unsanitary and annoying conditions of a toilet spill can be highly stressful, and can affect the morale of the spacecraft occupants.

Proposed zero gravity toilets are presented in U.S. Pat. Nos. 3,340,544 and 3,405,409. The present invention, however, represents a different development and solution, and has attributes that are reflected in the following objects.

SUMMARY OF THE INVENTION

In view of the foregoing it is a general object of the present invention to provide an effective system for collecting and handling bodily wastes in a zero gravity environment.

Another object of the present invention is to provide a zero gravity toilet that handles both liquid and solid wastes.

Still another object of the present invention is to provide a zero gravity toilet system that lends itself to using a disposable collection bag.

Accordingly, the present invention provides a toilet for use in zero gravity conditions, including housing having rigid walls including a main wall with a central, waste-passing opening therein and a flexible bag with walls that are porous to gases and impervious to liquids and solid waste material, and having an open end that attaches about the central opening, and which bag has an elongated neck portion extending inwardly of the housing from the central opening, and another portion for collecting and holding waste materials.

The invention also features a plurality of toroidal-shaped elements closely stacked in a coaxial array extending into the housing from a position adjacent the central opening, with the neck portion of the bag extending along the central portion of the toroidal array, and embraced thereby. The radially inner portion of each toroidal element has a flexible, resilient, and expandable member that can be pneumatically driven to greatly contract and then expand the central core of each toroidal element, each element of which is pneumatically connected to an air pressure and a vacuum source. The invention includes exhaust means for creating a negative pressure zone at the exterior of the bag, and to establish an air flow in through the bag opening and out through the walls of the bag. A spray manifold has nozzles that circumscribe the central opening, and is connected to a source of water under pressure. Finally, there is control means for the sources of compressed air and vacuum, for inflating and deflating the inflatable toroidal member according to a pre-determined sequence so as to generate an inwardly moving peristaltic wave effective upon the neck of the bag, and its contents.

BRIEF DESCRIPTION OF THE DRAWINGS

The accompanying drawings, which are incorporated in and form a part of the specification, illustrate a preferred embodiment of the present invention and together with the description serve to explain the principles of the invention wherein.

DETAILED DESCRIPTION OF THE INVENTION

Figure 1:
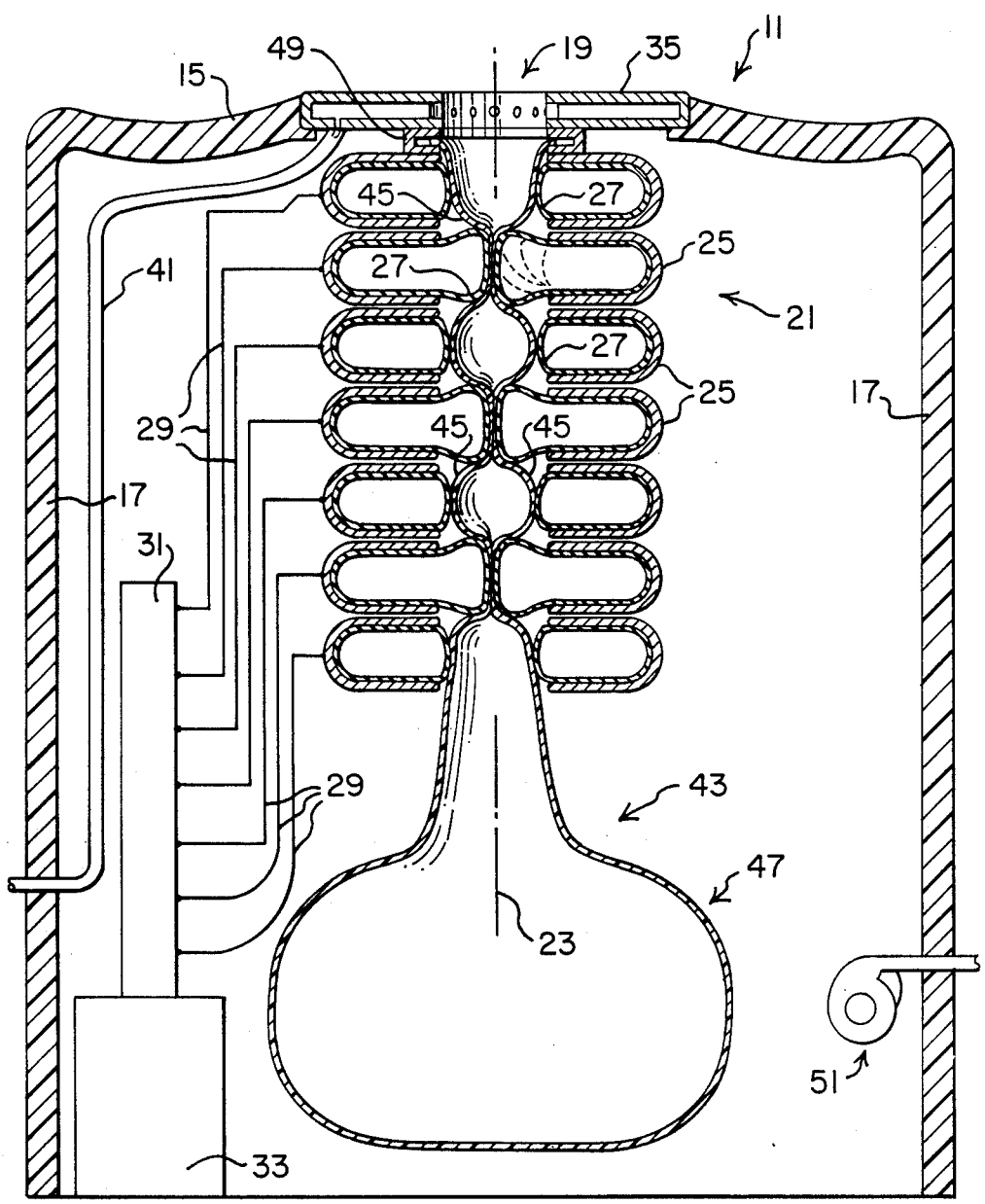
FIG. 1 is a side elevational view, in section, with schematics, illustrating a preferred embodiment of the invention.

Referring now to the drawings, FIG. 1 shows that a preferred embodiment of a toilet 11, according to the invention, includes housing 13 of lightweight rigid construction including outer wall 15 and side walls 17, by which the housing 13 is anchored to a spacecraft main structure (not shown). Outer wall 15 supports a circular manifold 35, to be described, which is provided with a circular, central waste-receiving opening at 19. Affixed in position just inwardly of opening 19 is an array 21 of toroidal elements, closely stacked and aligned about a common axis 23, and including a plurality of rigid toroidal shaped supports 25 which are rigidly supported in the position shown by attachment to housing 13 by support structure, not shown for the sake of clarity. Note that the central opening 19 also lies about the axis 23. Each closely stacked toroidal support 25 is opened on its radially inner side so as to support all sides except the radially inner side of an inflatable bladder 27. Each bladder 27 is connected in pneumatic communication by way of air lines 29 with valve 31 and with a source of pressurized air and vacuum which is indicated by the reference numeral 33.

Figure 2:
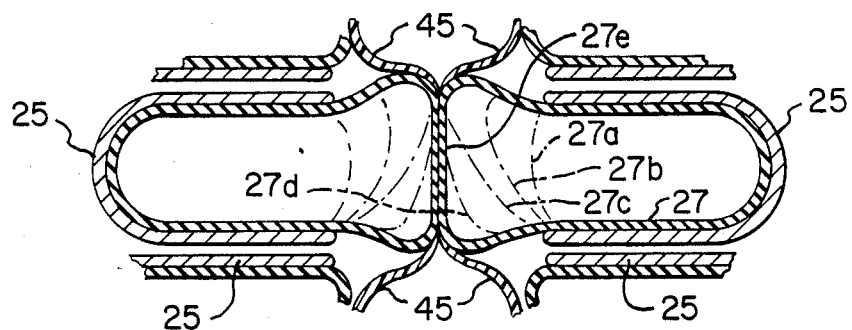
FIG. 2 is an enlarged sectional elevational view of an expandable toroidal element according to the invention.

The enlarged view of FIG. 2 shows that the unrestrained inner wall of the inflatable bladder 27 has a first position as indicated by reference numeral 27a. When fully inflated, the bladder in a wall has the configuration indicated by reference numeral 27e. When bladder 27 has been inflated to this position, the toroidal opening provided by bladder 27 in its first configuration is closed or substantially narrowed. It is preferable that the inner portion of a bladder 27 be adapted to enlarge in an asymmetrical fashion as inflation progresses, with progressive configurations as illustrated by reference numerals 27a through 27e. A preferred method for achieving this effect is to provide graded elasticity across the active portion of bladder 27. This may be provided by having several annular portions, each with a differing coefficient of elasticity, with the most elastic portion at the axially upper side as viewed in FIG. 2.

Figure 3:
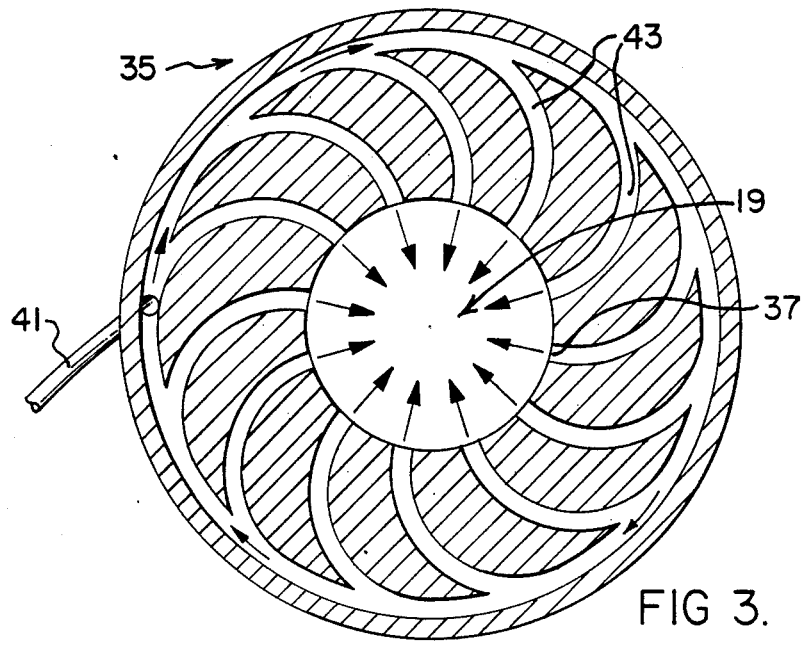
FIG. 3 is a sectional view of a flush water manifold taken along the line 3—3 of FIG. 1.
Figure 4:
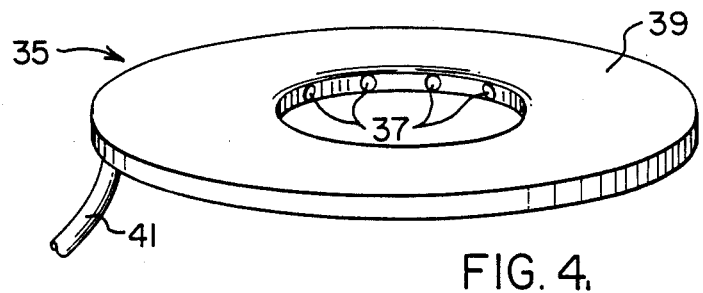
FIG. 4 is a perspective view of the spray manifold.

The invention also includes an annular-shaped spray manifold 35 shown in FIG. 4, and constructed of lightweight metal or polymeric material, and having nozzles 37, housing 39 and a connecting water supply line 41. Manifold 35 is firmly attached to the housing outer wall 15, and provides the central opening 19. The view of FIG. 3 shows that the spray manifold 35 has a number of supply channels 43 which supply the nozzles 37.

The invention includes a waste-collection bag 43 with an open-ended elongated neck portion 45 with its upper end, as shown in FIG. 1, releasably attached about the periphery of opening 19 to a retaining ring 49, and an enlarged lower end 47 for collecting waste material. The bag neck portion 45 lies between toroidal elements 21 and is embraceable by the inner walls of each inflatable bladder 27, in a pre-determined sequential manner to be described hereinafter. The walls of collection bag 43 are provided with micro pores so as to render them porous to gases yet impermeable to solids and liquids. It will be seen that this porosity will allow an air draft to be established to flow in the open end of the bag and out through its walls, in a manner to be described later.

FIG. 1 shows schematically an exhaust pump by reference numeral 51, for withdrawing air from within the walls of housing 13 and thus establishing a relatively negative pressure effective about the lower end 47 of the collection bag 43.

Finally, this is computere means for controlling the valve mechanism 31 to produce as required sequence of expansions and contractions of bladders 27 which generates a downwardly progressing peristaltic-like wave, acting upon the bag neck portion 45. FIG. 1 further illustrates the narrowing and expanding effect of a bladder 27 upon a section of the bag neck portion 45. In one preferred sequence, when an upper bladder is fully expanded, it will remain in that configuration until the lower adjacent bladder is also expanded to that position. The firstly expanded bladder may then be released to an open position, and so on with the array 21 of toroidal elements.

In operation of the device 11, exhaust fan 51 is energized to establish an air-flow into bag 43 via the central opening 19. Water may then be fed to manifold 35 by way of inlet line 41 to affect the spray of water through nozzles 37. The pre-established airflow will entrain the injected water to cause a flushing inflow of water. Solid waste material deposited at opening 19 will be entrained by and moved inwardly by the watery inflow. With the toroidal elements 21 being pneumatically activated, the above-mentioned waste material will be engaged by the inner walls of the bag neck portion 45, and will be carried downwardly, as viewed in FIG. 1, by the peristaltic-wave motion induced therein. In this manner solid waste and liquid are carried to the enlarged lower end 47 of the bag 43, and retained therein by the bag walls.

Referring again to the operation of an individual toroidal element, as shown in FIG. 2, the elastically-graded active wall of bladder 27 will first make constricting engagement in an uppermost region 55 and move to a lowermost region indicated by reference numeral 57.

When a bag 43 is filled with waste material it may be removed from toilet housing 13 by disengaging and tying off its upper end. Access to housing 13, for removal of bag 43, may be provided by a conventionally constructed doorway (not shown) in the wall of housing 13.

A preferred embodiment has been described and it shall be appreciated by those with ordinary skill in the art, that within the scope of the invention, various changes may be made. For example, the invention can include inflatable members that are differently configured yet functionally equivalent to the toroidal bladders 27. Thus it is aimed to cover all changes in its modifications as fall within the true spirit and scope of the invention.

What is claimed is:

1. Toilet for use in zero gravity conditions, comprising:
   (a) a support housing including an upper wall with a central opening therein adapted to receive therethrough solid and liquid waste material;
   (b) a flexible bag adapted for receiving and holding said waste material, the walls of said bag being permeable to gases and impermeable to solid and liquid waste material and having an open end that is releasably mounted about the inside periphery of said central opening, and said bag having an elongated neck portion and a lower portion adapted for receiving and collecting said waste materials;
   (c) a plurality of toroidal-shaped elements in a closely stacked, coaxial array and extending from a position adjacent said central opening and perpendicularly into said housing, the central portion of said array embracing the neck portion of said bag, each of said toroidal elements having a radially inner portion that is radially extendable and contractible, said inner portion having a contracted position in which it defines an opening and being pneumatically extendable to close said opening;
   (d) means, in pneumatic communication with each of said toroidal elements for inflating and deflating said inner portions, so as to radially extend and contract said portions;
   (e) means for generating a relative negative air pressure about the exterior of said bag, so that a flow of air is generated to flow in the bag opening and out of said bag by way of gas-permeable walls;
   (f) liquid spray means including spray manifold mounted adjacent said central opening with a plurality of jets aligned about the periphery of said opening for spraying liquid inwardly; and
   (g) control means for said inflating and deflating means, whereby said elements compress and release adjacent annular portions of said bag neck portion, according to a pre-determined sequence by which a peristaltic-like wave is generated across said neck portion in an axially inward direction.

2. Toilet as defined in claim 1 wherein each radially inner portion of said toroidal elements includes a resilient, flexible wall.

3. Toilet as defined in claim 2 including a toroidal bladder that provides said resilient wall, and a rigid toroidal structure enclosing and supporting said bladder and opened at its radially inner side.

4. Toilet as defined in claim 2 wherein said wall has annular regions that vary in elasticity, such that axially outer annular portions, upon inflation, will compress said bag neck portion in advance of lesser elastic annular portions.

5. Toilet as defined in claim 1 wherein said toroidal elements compress and release said neck portion in a sequence by which a compression by an axially outer element is maintained until it is followed by the compression of a next axially inward adjacent element.

6. Toilet as defined in claim 1 with support means for said elements attached to said housing.

7. Toilet as defined in claim 1 wherein said bag is made of a polymeric material.

8. Toilet as defined in claim 1 wherein said means for generating a negative pressure comprises exhaust ventilation means.

9. Toilet as defined in claim 1 wherein said bag is selectively perforated with micro holes to permit free passage of gas therethrough but blocks the passage of liquids because of surface tension effects thereof.

10. Toilet as defined in claim 1 wherein said means for inflating and deflating said elements includes air lines connecting each element with an air pressure source and a vacuum source.

* * * * *